V. E. BEAGLE.
TRACTOR TRUCK.
APPLICATION FILED JULY 16, 1918.
1,364,233.
Patented Jan. 4, 1921.
4 SHEETS—SHEET 1.
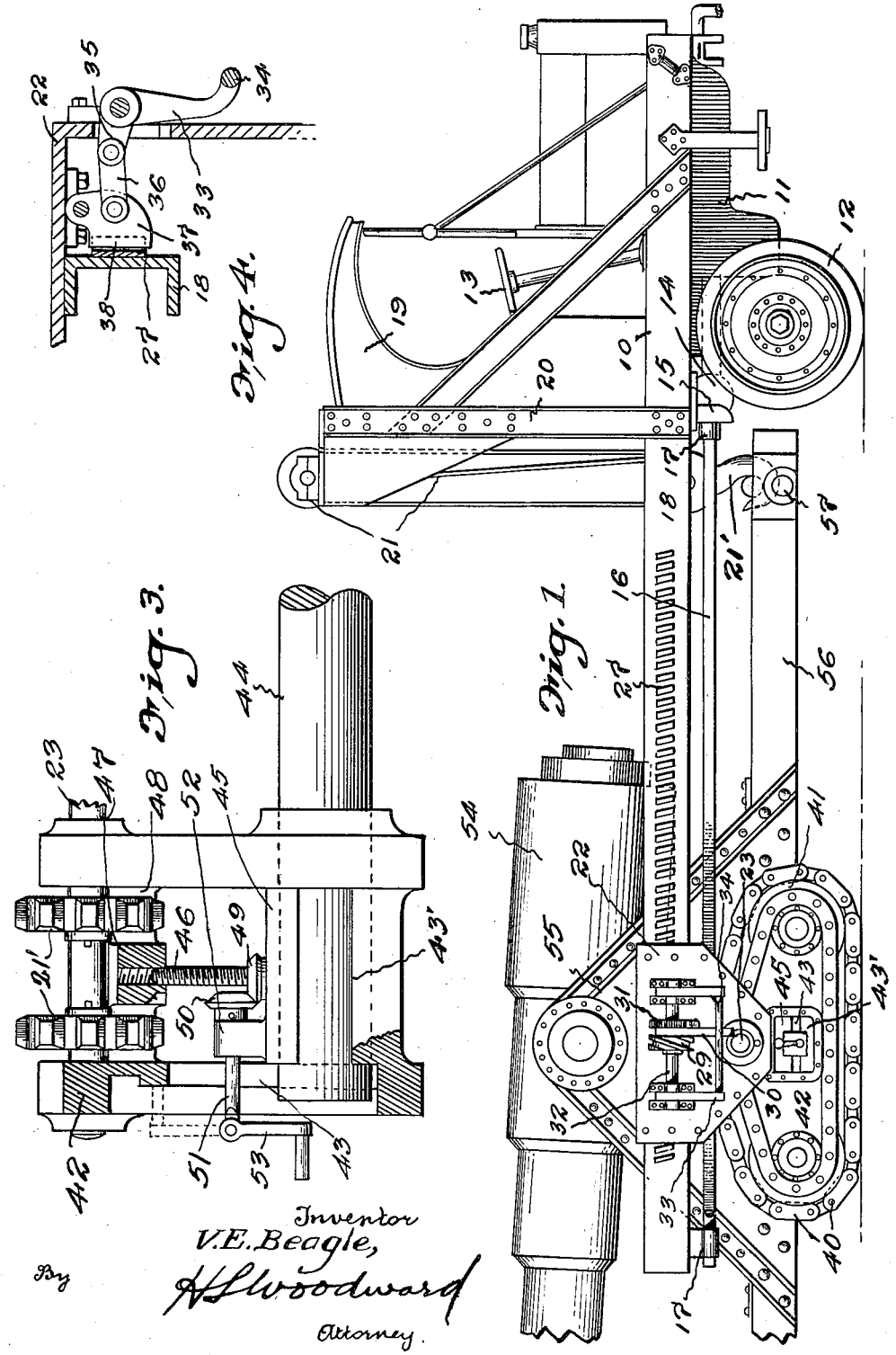
Inventor
V. E. Beagle,
By H. L. Woodward
Attorney.

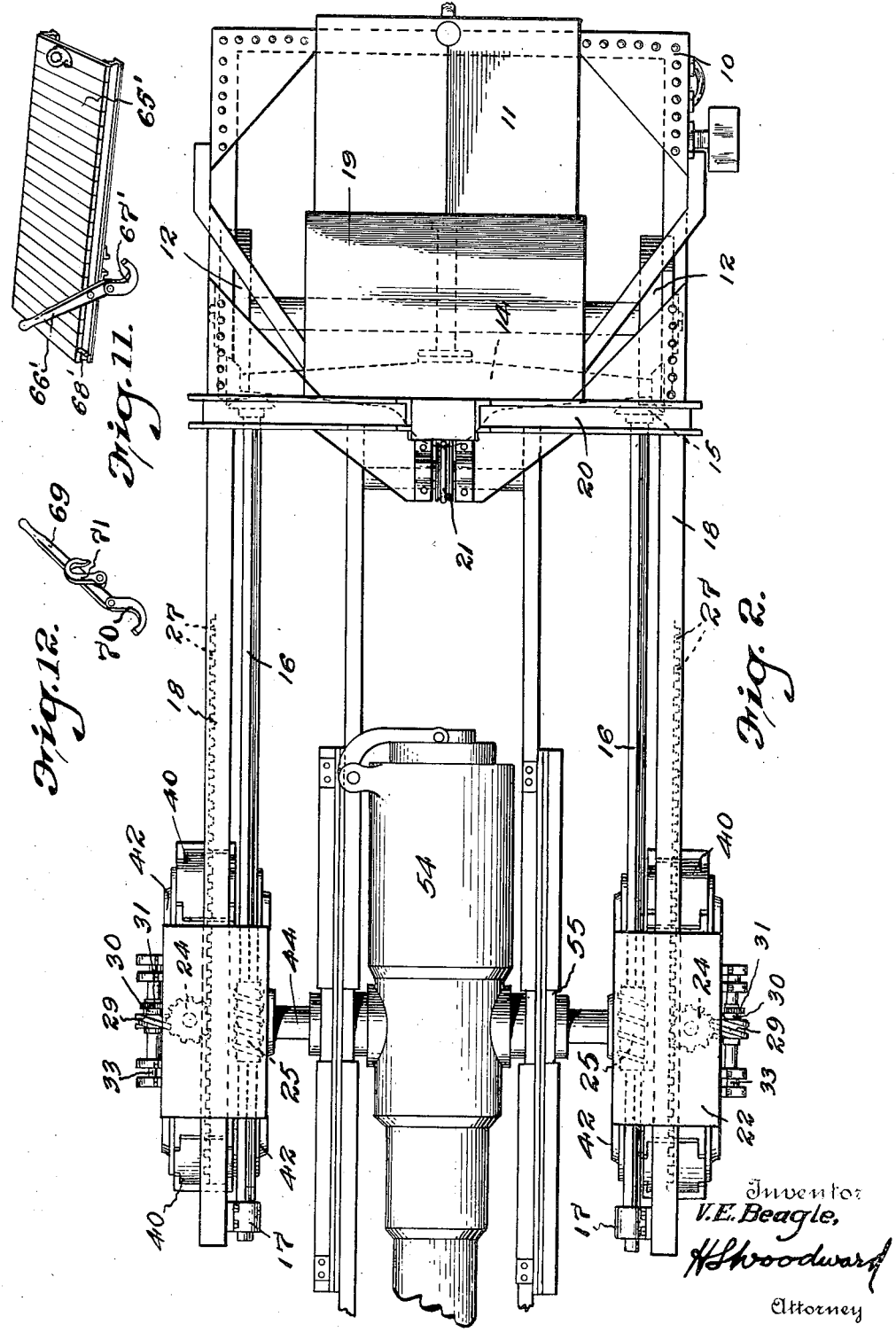

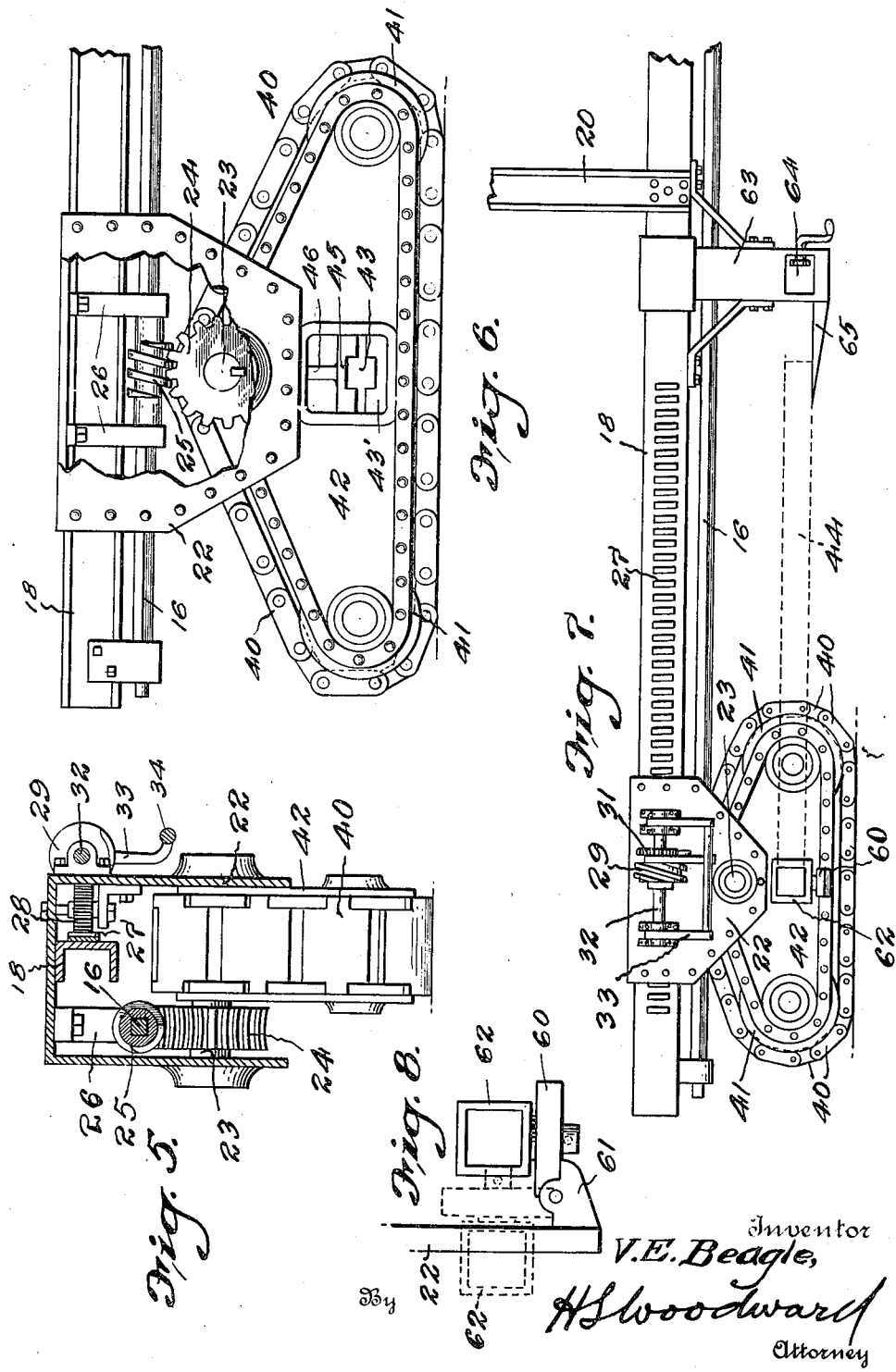

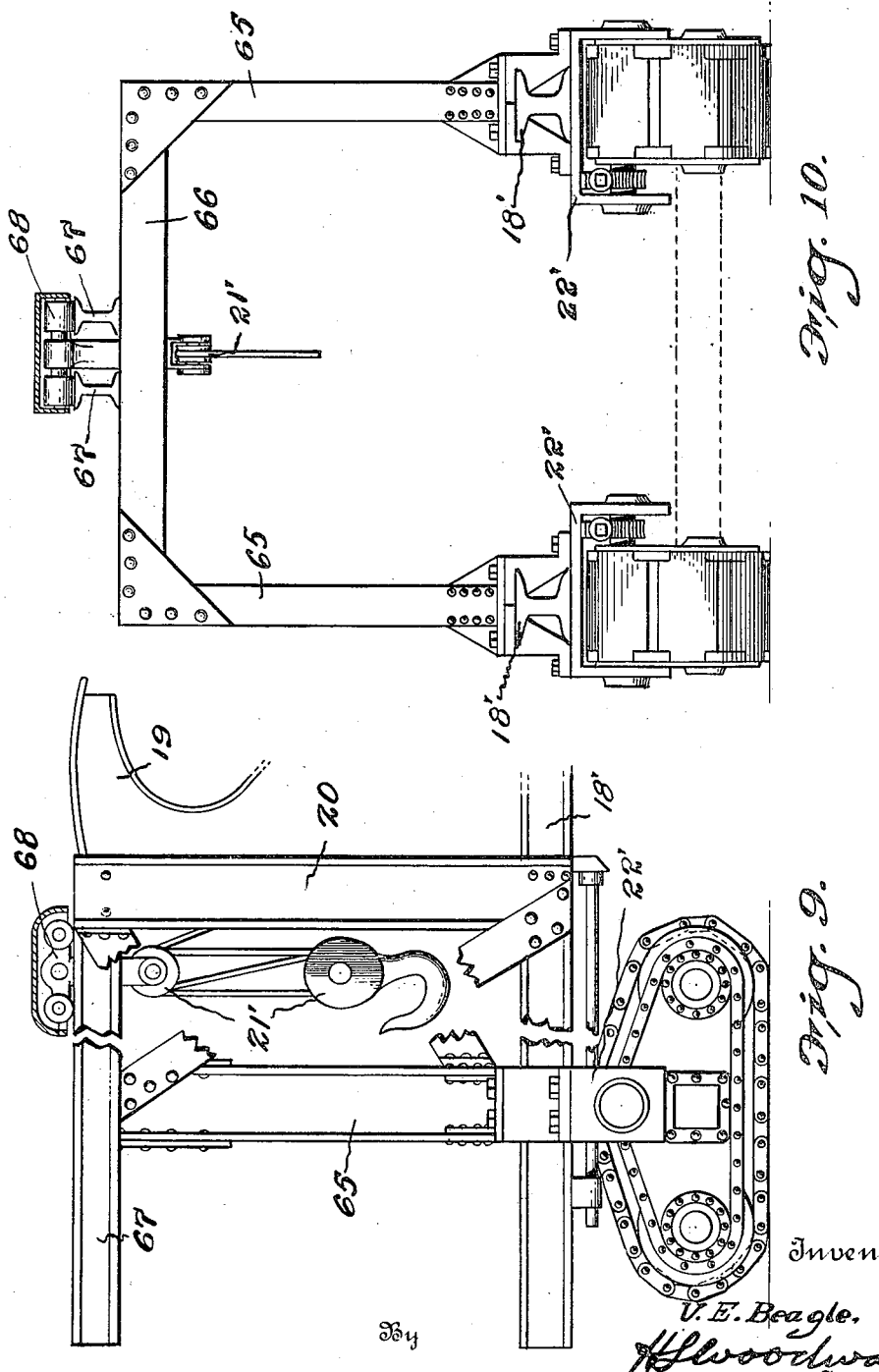

UNITED STATES PATENT OFFICE.

VICTOR E. BEAGLE, OF BINGHAMTON, NEW YORK.

TRACTOR-TRUCK.

1,364,233. Specification of Letters Patent. Patented Jan. 4, 1921.

Application filed July 16, 1918. Serial No. 245,188.

*To all whom it may concern:*

Be it known that I, VICTOR E. BEAGLE, a citizen of the United States, residing at Binghamton, in the county of Broome and State of New York, have invented certain new and useful Improvements in Tractor-Trucks, of which the following is a specification.

The invention has for an object to effect improvements in motor trucks, whereby an open frame truck may be provided, adapted to be backed into position to embrace a load to be carried, and having no gearing located between the sides of the frame, as well as having all structural elements clear of the space between the sides of the frame, while still attaining an efficient drive to the rear wheels or other tractive elements, enabling traction at that part of the vehicle where the load is greatest.

It is an important purpose of the invention to adapt such a truck to the moving of heavy ordnance without requiring the dismounting of the gun from its carriage, but permitting the movement of the gun and carriage complete as a unit directly from its concrete base, without requiring the use of skids or tracks, and without requiring it to be lifted over any part of the truck.

The truck is also adapted to other uses, and additional advantages and features of invention will appear from the construction, arrangement and combination of parts hereinafter described and shown in the drawings, wherein, Figure 1 is a side elevation of one embodiment of the truck, Fig. 2 is a top plan view thereof, Fig. 3 is a detail of a bar locking device, Fig. 4 is a cross sectional detail of a means for locking a longitudinally adjustable carriage on the side frame, Fig. 5 is a cross sectional view of one of the rear tractor elements in one form, Fig. 6 is a detail elevation partly in section, of one of the tractor units, Fig. 7 is a fragmentary side elevation of a modified construction, Fig. 8 is a detail of the bar support involved in the last mentioned modification, Fig. 9 is a fragmentary side elevation of a further modification of the truck, Fig. 10 is a rear elevation thereof, Figs. 11 and 12 illustrate details.

There is illustrated in Figs. 1 to 6 a truck or tractor including a body frame 10, upon the extreme forward part of which there is mounted a power unit and transmission 11 of a familiar form, the forward wheels 12 being provided with any suitable steering mechanism, operated through the agency of the wheel 13. Closely adjacent the transmission of the power unit, there is a differential gearing 14 of a familiar form indicated formally, the details thereof being familiar in the art, which through the agency of the usual countershaft and beveled gears inclosed in the housings 15 at each side, is utilized to drive longitudinally extending square shafts 16, mounted in suitable bearings at the inner side of the side beams 18 of the frame 10. The space inwardly of the shafts 16, (which are closely adjacent the beams 18,) is entirely clear, as may be seen in Fig. 2, from immediately behind the driver's cab 19, to the rear, the frame being entirely open and the side beams 18 unconnected at their rear parts. Upon a suitable bridging 20 immediately adjacent the cab 19, there is mounted a hoisting device 21, which may include any usual mechanism for operating cables or the like suitable for installation upon the truck beneath the cab or elsewhere, as found desirable. In the present instance, a series of cables are shown as comprising a part of the hoisting mechanism, by means of which a large hook 21' is raised or lowered, for use as will be described in detail hereinafter.

Slidably engaged upon each side beam 18, there is a carriage frame 22, extending below the beams 18 in each instance, and having a large cross shaft 23 mounted therein as illustrated. Upon the shaft there is mounted a gear 24, meshed with a worm 25 carried in a suitable mounting 26 upon the carriage, the worm receiving slidably therethrough the square shaft 16 before mentioned, whereby the gear 24 may be driven at any position of the carriage upon the frame of the truck. For movement of the carriage upon the truck frame, a rack segment 27 is formed upon the outer side of the beams 18, with which there is meshed a gear 28 mounted in the carriage, the gear being rotated by means of a worm wheel 29 driven by the lever 30 and ratchet and pawl device 31, the ratchet wheel of the latter device and the worm wheel 29 being secured upon the shaft 32 mounted upon the outer side of the carriage 22. Pivoted upon the shaft 32 there are levers 33, of a locking device, the outer ends of these levers being connected by a handle bar 34, adapted to rest upon the lever 30 at times, as will be subsequently explained. The levers 33, as may be seen in Fig. 4 are of the bell crank type, having a short arm 35 extending into the carriage, and connected by a link 36 to a pivoted jaw 37, having teeth 38 adapted to intermesh with the rack teeth 27 when the levers 33 are at the lower limit of their movement. The arm 35 is arranged to pass slightly above the dead center so that the levers 33 will be locked in their lowermost position when the jaw 37 is properly engaged with the rack 27. In this manner, when the locking device is engaged with the rack, the levers 30 cannot be operated to move the carriage 22, and it will be necessary to lift the lever 33, by means of the bar 34, in order to permit operation of the lever 30, for movement of the truck, whereby unlocking of the device is assured for movement of the truck carriage.

The gear 24 is preferably splined upon the shaft 23, and by means of sprockets 23' on the shaft, there is driven a chain 40 of a traction device, including end wheels 41 at the front and rear of a suitable framing 42 as illustrated, although the construction of the tractive means may conform to any usual practice. The frame 42 is formed with a transverse opening 43 therethrough, in which there is adapted to be rested the end of a load carrying bar or beam 44, as illustrated in Figs. 2 and 3.

Means is provided for locking the bar 44 when adjusted in position with respective ends in each of the traction units, this comprising a vertically slidable plate 45, upon which there bears the lower end of a screw 46 engaged in a longitudinal bar 47 extended between two cross bars 48, one of which bars is shown in Fig. 3, the other being in a corresponding position at the opposite end of the frame 42. Upon its lower end the screw 46 is provided with a beveled gear 49 meshed with which there is a similar gear 50 carried by a horizontal shaft 51 mounted in a bearing 52 upon the upper side of the plate 45, the shaft extending outwardly through the opening 43, and being provided with a crank 53, pivoted upon the shaft so that it may be swung into position with the handle portion extending inwardly as dotted in Fig. 3, whereby liability of its striking obstructions is obviated.

A gun 54 is illustrated mounted upon a carriage 55 of a suitable type and after any approved manner of mounting, the carriage including a base frame 56 which in the present instance extends rearwardly of the gun a distance, and is provided with a front cross bar 57, the central part of which is set upwardly, enabling the ready engagement of the hook 21' thereunder.

In the use of the device, to remove the gun from the ground or from an emplacement, it is merely necessary to bring the truck into proper alinement therewith, and back the truck into position with the side beams 18 extending on respective sides of the gun. The tractor units are then adjusted in a position close to the transverse medial line of the center of gravity of the gun, and preferably slightly to the rear thereof, after which the hook 21' is engaged beneath the bar 57 and the hoisting apparatus operated to lift the forward end of the gun mounting as far as required. The lower side of the frame being hoisted above the opening 43, the bar 44 is extended through the traction units and the load lowered until it rests upon the bar. Lowering movement is then continued until the rear part of the load has cleared the ground sufficiently, for transportation.

In Figs. 7 and 8 there is illustrated a means for supporting the bar 44 when out of load supporting position, this comprising a pivoted shelf element 60, pivoted upon brackets 61 upon the side of the frame 22, the shelf 60 having swiveled therein and located upon the upper side a guide means 62, in which the bar may be slidably engaged, the shelf 60 and sleeve being movable upward and inwardly to the positions dotted in Fig. 8, so as to lie out of the way as much as possible, when not in use. It may be moved into the opening 43 before mentioned, and in such case, the bar 44 may be shortened sufficiently to permit entrance of the guide sleeve, this being a matter of degree and proportions, which may be favored by the builder. At the forward part of the truck frame, a bracket 63 is provided, pendent, from one of the beams 18, an opening 64 being provided in the lower part of the bracket through which a load bar may be inserted in the same manner as such a bar may be inserted through the opening 43. Upon the rear side of the bracket there is provided a step 65 upon which the bar 44 may be rested when withdrawn from the opening 43, and its outer end swung into the desired position as dotted in Fig. 7, one end being supported by the guide 62. In this way, the bar may be carried beside the truck frame with convenience.

If desired, the tractor unit may be fixedly connected to the U-shaped frame of the truck, as shown in Fig. 9 and 10. The forward part of the truck construction may be the same as before described and illustrated, and the construction of the tractor unit may be the same as before, with the exception that the frame 22 may be omitted, together with its apparatus for shifting the tractor units and locking it in place, and a suitable frame 22' is provided which may be secured to the beams 18' of the truck in a suitable manner. Supported upon the tractor unit and frame there are columns 65, carrying a cross beam 66, centrally upon which there are parallel longitudinal beams 67 extending to the bridging 20, carrying a suitable truck 68 adapted to travel longitudinally on the beams, a hoisting device 21' being mounted upon the truck 68. The beams 67 preferably project rearwardly of the truck proper, a distance, as shown in Fig. 9. With the use of this form of truck, it may be backed until its load is in position with its major part forward of the tractors, and the hoisting apparatus moved rearwardly upon the beam 67 as far as necessary to lift objects of various lengths without adjusting the tractors on the frame. The load is then raised sufficiently to permit the engagement of the load bar 44 thereunder and its forward end supported by the hoisting apparatus while the load is moved, unless some form of forward support is desired, as indicated at 63 and 64 in Fig. 7.

It will be seen that a truck is provided which may be constructed of great strength, but minimum weight, for carrying very heavy loads, and adapted to permit the loading of the heaviest objects in a minimum of time and with great ease. It obviates the necessity for the use of skids or other appliances in loading guns upon transport trucks, and readily enables the movement of heavy ordnance with its emplacement frame without requiring separate handling of the frame and gun, permitting deposit of the gun frame directly upon a concrete bed, as well as its removal directly therefrom, by the truck upon which the gun is to be transported.

It may be found desirable to provide means to secure the load upon the load carrying bar so that loose lateral movement of the load within the frame will be prevented. One form of such means is illustrated in Fig. 11, applied to a loading platform 65' constructed to be bodily carried by my truck. In this instance a lever 66' is pivoted upon the side of the platform, and an eccentric connection made between the lever and a hook-like clamping device 67' adapted to engage beneath the bar 44 and be drawn upward forcibly against the under side of the bar when the lever is moved downwardly from the raised position shown. This will securely lock the load upon the bar. A pin 68' may be inserted in the side of the platform 65' above the lever after its depression, to retain it in locking position.

Where irregular loads are to be carried, the lever and locking parts may be constructed as in Fig. 12, where the lever 69 is provided with a clamping element 70 similar to the one 67', and inwardly of that a hook 71 is pivoted upon the lever, adapted to be inverted as illustrated, and engaged with chain or cable that may be around the load.

What is claimed:

1. In a truck of the character described, a truck frame substantially U-shaped in plan, a motor unit on the forward part, a traction unit upon each side toward the rear, respective longitudinal shafts adjacent the sides of the truck frame, operatively connected with the traction units, and differential operative connections between the shafts and motor unit, forwardly of the opening between the sides of the frame.

2. A U-shaped truck frame open at the rear, a motor upon the bight portion, respective sliding tractive units upon the sides of the frame, means to move the tractive units upon the frame, means to lock the tractive units upon the frame, the tractive units including a worm, movable with the said units, shafts at the sides of the frame slidable in respective worms, and differential operative connections between the shafts and motor forwardly of the frame opening.

3. A truck of the character described comprising a U-shaped horizontal frame, tractor units on the sides thereof, a motor forwardly of the opening of the frame, respective operative connections between the tractor units and motor without the opening of the frame, and a load spanning connection between the sides of the frame at the rear part of a height to span the loads to be carried.

4. In a truck of the character described a frame including side elements, a motor at the forward part of the frame and tractive load carrying units slidable upon said side members of the frame including an element held in fixed slidable relation to the side members of the first named frame and having an extension therebelow, and a tractive frame having rocking engagement upon said extension, tractive means upon said frame having a driving element concentric with the rocking pivot and driving connections between the tractive means and said driving element including a shaft angular in cross section mounted revolubly upon said first named frame and a motion transmission member carried by said tractive unit slidable upon the shaft.

In testimony whereof I have affixed my signature in presence of two witnesses.

VICTOR E. BEAGLE

Witnesses:
HARRY A. YETTER,
LOUISE CLEARY.